(12) United States Patent
van den Bogerd et al.

(10) Patent No.: US 7,258,923 B2
(45) Date of Patent: Aug. 21, 2007

(54) MULTILAYERED ARTICLES AND METHOD OF MANUFACTURE THEREOF

(75) Inventors: Jos van den Bogerd, Sint Annaland (NL); Estelle Cheret, Stabroek (BE); Josephus Hubertus Cornelius Maria Dekkers, Breda (NL); Rein Mollerus Faber, Bergen op Zoom (NL); Jan Willem Goedmakers, Putte (NL); Christianus J. J. Maas, Rilland (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/698,321

(22) Filed: Oct. 31, 2003

(65) Prior Publication Data

US 2005/0095433 A1    May 5, 2005

(51) Int. Cl.
*B32B 27/18* (2006.01)
(52) U.S. Cl. ............... 428/412; 428/212; 428/480; 430/14
(58) Field of Classification Search ........... 428/412, 428/480, 212; 430/14
See application file for complete search history.

(56) References Cited

U.S. PATENT DOCUMENTS

| | | | |
|---|---|---|---|
| 3,885,855 A | 5/1975 | Gross | |
| 4,031,063 A | 6/1977 | Conciatori et al. | |
| 4,250,078 A | 2/1981 | McFarlane et al. | |
| 4,323,668 A | 4/1982 | Brunelle | |
| 4,648,710 A * | 3/1987 | Ban et al. | 356/4.07 |
| 4,895,904 A | 1/1990 | Allingham | |
| 5,405,680 A | 4/1995 | Chang et al. | |
| 5,712,332 A | 1/1998 | Kaieda et al. | |
| 6,022,920 A | 2/2000 | Maxwell et al. | |
| 6,060,154 A | 5/2000 | Adachi et al. | |
| 6,136,441 A * | 10/2000 | MacGregor et al. | 428/412 |

(Continued)

FOREIGN PATENT DOCUMENTS

EP    0 454 349 A2    4/1991

(Continued)

OTHER PUBLICATIONS

Burkhardt, G. et al., "Plastics, Processing", Ullmann's Encyclopedia of Industrial Chemistry, Wiley-VCH, online posting date Jun. 15, 2000.*

(Continued)

*Primary Examiner*—Irina S. Zemel
(74) *Attorney, Agent, or Firm*—Cantor Colburn LLP (57) ABSTRACT

Disclosed herein is a multilayered sheet comprising a core layer comprising a thermoplastic polymer and an IR absorbing additive; a first cap layer comprising a thermoplastic polymer and an electromagnetic radiation absorbing additive; wherein a surface of the first cap layer is disposed upon and in intimate contact with a surface of the core layer. Disclosed herein too is a method for manufacturing a multilayered sheet comprising melt blending a composition comprising a thermoplastic polymer and an IR absorbing additive to produce a core layer; melt blending a composition comprising a thermoplastic polymer and an ultraviolet radiation absorber to produce a first cap layer; combining the core layer with the first cap layer in such a manner that the cap layer is disposed upon and in intimate contact with a surface of the core layer.

41 Claims, 4 Drawing Sheets

U.S. PATENT DOCUMENTS

| | | | |
|---|---|---|---|
| 6,143,387 A | 11/2000 | Kubler et al. | |
| 6,221,945 B1 | 4/2001 | Kuno et al. | |
| 6,277,187 B1 | 8/2001 | Kuno et al. | |
| 6,319,613 B1 | 11/2001 | Takeda et al. | |
| 6,420,512 B1 | 7/2002 | McCloskey et al. | |
| 6,482,570 B1 | 11/2002 | Hotta | |
| 6,548,623 B2 | 4/2003 | Brunelle et al. | |
| 6,620,872 B2 | 9/2003 | Fisher | |
| 6,733,872 B2 | 5/2004 | Kuniko | |
| 2002/0182389 A1* | 12/2002 | Dobler | 428/212 |
| 2003/0054160 A1 | 3/2003 | Fisher et al. | |
| 2003/0175488 A1 | 9/2003 | Asthana et al. | |
| 2004/0028920 A1 | 2/2004 | Fujitta et al. | |
| 2004/0071957 A1 | 4/2004 | Fujita | |
| 2004/0152806 A1 | 8/2004 | Koga et al. | |
| 2005/0215750 A1 | 9/2005 | Koga et al. | |

FOREIGN PATENT DOCUMENTS

| | | |
|---|---|---|
| EP | 0 727 306 A2 | 1/1996 |
| EP | 0 727 306 B1 | 1/1996 |
| EP | 0 905 100 B1 | 9/1998 |
| EP | 0 943 587 A1 | 10/1998 |
| EP | 1 008 564 A1 | 12/1999 |
| EP | 1529632 A1 | 5/2005 |
| EP | 1724110 A1 | 11/2006 |
| GB | 2 014 513 A | 2/1979 |
| GB | 2 057 355 A | 8/1980 |
| JP | 06-122803 | 5/1994 |
| JP | 07-070356 | 3/1995 |
| JP | 08-104835 | 4/1996 |
| JP | 09-063117 | 3/1997 |
| JP | 2000024591 A | 1/2000 |
| JP | 2000-072484 | 3/2000 |
| JP | 2000-096034 | 4/2000 |
| JP | 2000-319554 | 11/2000 |
| JP | 2001-089202 | 4/2001 |
| JP | 2002-369629 | 12/2002 |
| JP | 2003-327717 | 11/2003 |
| WO | WO95/02504 | 1/1995 |
| WO | 9811031 | 3/1998 |
| WO | WO 02/060988 A1 | 8/2002 |
| WO | 02083410 A1 | 10/2002 |
| WO | WO 02/077081 A | 10/2002 |

OTHER PUBLICATIONS

Japanese Abstract for JP2003-327717 dated Nov. 19, 2003.
Japanese Abstract for JP2004-059875 dated Feb. 26, 2004.
Japanese Abstract for JP2004-043764 dated Feb. 12, 2004.
SMM Sumitomo Metal Mining Co., Ltd. Brochure "Weathering properties of PC sheet incorporated with KH particles" Jan. 2004.
SMM Sumitomo Metal Mining Brochure "Weathering properties of PC sheet incorporated with incorporated KH particles" Jun. 2003.
European Search Report for European application No. 03258166.2-1214 dated Mar. 19, 2004.
Japanese Abstract for JP2000319554A Nov. 21, 2000.
Schelm et al. "Dilute $LaB_6$ nanoparticles in polymer as optimized clear solar control glazing" Applied Physics Letters, vol. 82, No. 24, Jun. 16, 2003 pp. 4346-4348.
SMM Sumitomo Metal Mining Brochure "A new IR-active agent to screen out solar heat 'KH'" Sumitomo Metal Mining Co., ltd., Performance Materials Dept., 11-3 Shimbashi, 5-chome, Tokyo 105-8716 Japan—www.smm.co.jp.
SMM Sumitomo Metal Mining Brochure "IR-Shielding Dispersions" Sumitomo Metal Mining Co., ltd., Performance Materials Dept., 11-3 Shimbashi, 5-chome, Tokyo 105-8716 Japan—www.smm.co.jp.
International Search Report PCT/US2004/041140; International Filing date Sep. 12, 2004.
Patent Abstracts of Japan, Publication No. 2000024591, Publication Date Jan. 25, 2000.
European Search Report, Application No. EP 04 26 7697, Mailing Date Apr. 05, 2005.
U.S. Appl. No. 10/955,038, filed Sep. 30, 2004, Jos van den Bogard et al., Infra-Red Radiation Absorption Articles and Method of Manufacture Thereof (Available in IFW).
European Patent Office "EPO Boards Of Appeal Decisions" Last updated on Tue, Sep. 7, 2004; pp. 1-9; available on-line at: http://legal.european-patent-office.org/dg3/bibilo/t910623eu1.htm.
EP Search Report dated Oct. 11, 2006; European Application No. 05254761.9-1214.
European Search Report; International Application No. PCT/US2006/025870; Applicant's File Reference No. 08CS181519; International Filing date Jun. 30, 2006; Date of Mailing Feb. 1, 2007; 5 pages.

* cited by examiner

LaB6 in Core Layer

LaB6 in Cap layer

FIG. 5

MULTILAYERED ARTICLES AND METHOD OF MANUFACTURE THEREOF

BACKGROUND

This disclosure relates to multilayered articles and methods of manufacture. In particular this disclosure relates to multilayered sheets for absorption of IR radiation and methods of manufacture thereof.

Absorption of excessive amounts of solar radiation by the interior surfaces of a vehicle, residential home or office building can result in elevated interior temperatures, reduced comfort for the occupants, accelerated degradation of interior materials, and an increase in the requirement for larger air conditioning units. In vehicles especially, under high static-soak conditions, which can occur in vehicles parked in the hot summer sun, especially in a desert climate, surface temperature within a closed car can reach over 100° C., and the entire thermal mass of the car can be raised to high temperatures.

Increasing the cooling load of the air conditioning unit in a vehicle to ameliorate heat discomfort would go against the trend currently prevailing in the automobile industry. Automobile engines are being downsized to reduce weight and improve fuel efficiency and are less able to handle the power drain of the larger air conditioners. A recent concern to industry and Government is the role played by automotive air conditioners as a source of chlorofluorocarbons (CFC) released into the atmosphere, increased cooling load will lead to even larger air conditioning units, which will exacerbate this problem. Thus, there is a need for new technologies and passive design solutions, which would lead to reduced solar heat loads in automobiles as well as for residential and office buildings.

SUMMARY

Disclosed herein is a multilayered sheet comprising a core layer comprising a thermoplastic polymer and an IR absorbing additive; a first cap layer comprising a thermoplastic polymer and an electromagnetic radiation absorbing additive; wherein a surface of the first cap layer is disposed upon and in intimate contact with a surface of the core layer.

Disclosed herein too is a method for manufacturing a multilayered sheet comprising melt blending a composition comprising a thermoplastic polymer and an IR absorbing additive to produce a core layer; melt blending a composition comprising a thermoplastic polymer and an ultraviolet radiation absorber to produce a first cap layer; combining the core layer with the first cap layer in such a manner that the cap layer is disposed upon and in intimate contact with a surface of the core layer.

Disclosed herein is a method for manufacturing a multilayered sheet comprising co-extruding a core layer comprising a thermoplastic polymer and an IR absorbing additive with a first cap layer comprising a thermoplastic polymer and an ultraviolet radiation absorber.

Disclosed herein too are articles comprising the multilayered sheet detailed above.

DETAILED DESCRIPTION OF PREFERRED EMBODIMENTS

Disclosed herein is a multilayered sheet that displays high absorption of light in the ultra-violet (UV) region of the electromagnetic spectrum, high absorption and high reflectance of light in the near infrared (IR) region, while providing high transmittance and low reflectance for light in the visible region. The multilayered sheet comprises a core layer comprising a thermoplastic polymer and an IR absorbing additive. In one embodiment, a surface of the core layer is disposed on and in intimate contact with a surface of a first cap layer comprising a thermoplastic polymer and an electromagnetic radiation absorbing additive. In another embodiment, a surface of the core layer is disposed between and in intimate contact with a surface of a first and a second cap layer, each of which comprises a thermoplastic polymer and an electromagnetic radiation absorbing additive. The multilayered sheet is generally mounted in any application (e.g., a building or automobile) in such a manner so that solar radiation impinges upon the cap layer prior to impinging upon the core layer. The multilayered sheet is preferably manufactured by co-extrusion, and this will be detailed later. It is to be noted that all ranges disclosed herein are inclusive and combinable.

The electromagnetic radiation absorbing additive may be an absorber of any radiation from the electromagnetic spectrum. In an exemplary embodiment, the electromagnetic radiation absorbing additive is an ultraviolet (UV) radiation absorber. In another exemplary embodiment, the electromagnetic radiation absorbing additive is an IR absorbing additive that can absorb IR radiation. In yet another exemplary embodiment, the electromagnetic radiation absorbing additive is an additive that can absorb IR radiation and UV radiation.

Figure 1:
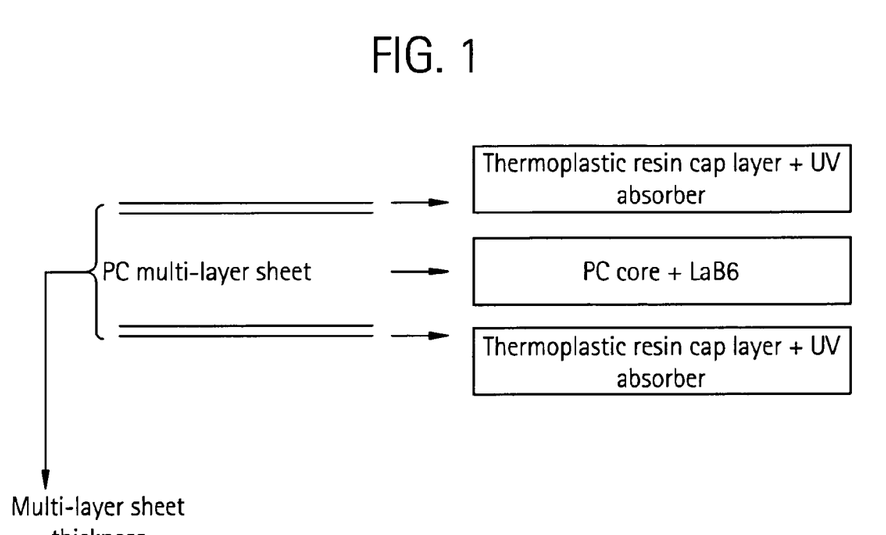
FIG. 1 is a schematic depicting a core layer disposed between two cap layers in accordance with the invention.
Figure 2:
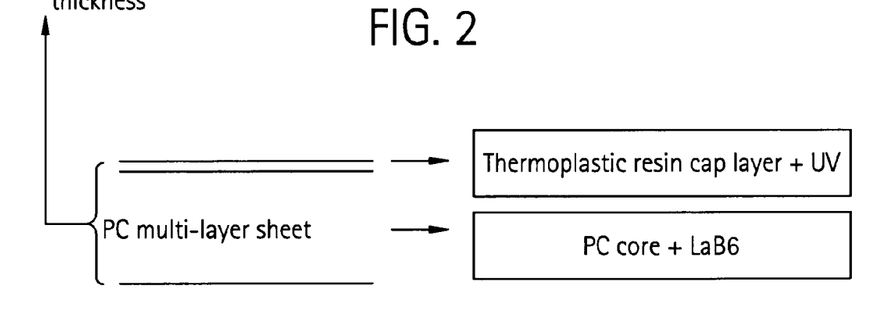
FIG. 2 is a schematic depicting a core layer disposed upon and in intimate contact with a single cap layer.

FIG. 1 is a schematic depicting a surface of a core layer disposed in between the surface of a first and the surface of a second cap layer, while FIG. 2 is a schematic depicting a surface of a core layer disposed upon and in intimate contact with a surface of only the first cap layer. Both the core and the cap layers may be a single sheet of a thermoplastic polymer or multiple sheets of a thermoplastic polymer. From the FIGS. 1 and 2, it may be seen that the thickness of the multilayer sheet refers to the thickness of the core layer added to the thickness of the cap layer.

As stated above, both, the core and the cap layer comprise thermoplastic resins. Thermoplastic polymers that may be used are oligomers, polymers, ionomers, dendrimers, copolymers such as block copolymers, graft copolymers, star block copolymers, random copolymers, and the like, as well as combinations comprising at least one of the foregoing polymers. Suitable examples of thermoplastic polymers that can be used as the core and cap layer are polyacetals, polyacrylics, polycarbonates polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherke- tones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or combinations comprising at least one of the foregoing thermoplastic polymers. The preferred thermoplastic polymers for use in the core layer are polycarbonates or copolymers of polycarbonate and polysiloxane. The preferred thermoplastic polymers for use in the cap layer are polycarbonate, copolyestercarbonates, or blends of polyesters with polycarbonates.

As stated above, the core layer may be a single sheet of a thermoplastic polymer or multiple sheets of a thermoplastic polymer. It is preferred for the thermoplastic polymer to be transparent to light in the optical wavelength region of the electromagnetic spectrum. The core layer generally comprises a polycarbonate and an IR absorbing additive. As used herein, the terms "polycarbonate", "polycarbonate composition", and "composition comprising aromatic carbonate chain units" includes compositions having structural units of the formula (I):

(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of the $Y^1$ radicals are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being biphenyl. The bridging radical $Y^1$ can be a saturated hydrocarbon group such as methylene, cyclohexylidene or isopropylidene.

Polycarbonates may be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

(III)

wherein $R^a$ and $R^b$ each independently represent hydrogen, a halogen atom, preferably bromine, or a monovalent hydrocarbon group, p and q are each independently integers from 0 to 4, and $X^a$ represents one of the groups of formula (IV):

(IV)

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (III) include the bis(hydroxyaryl) alkane series such as, 1,1-bis(4-hydroxyphenyl)methane, 1,1-bis(hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations comprising at least one of the foregoing bisphenol compounds.

Other bisphenol compounds that may be represented by formula (III) include those where X is —O—, —S—, —SO— or —S(O)$_2$—. Some examples of such bisphenol compounds are bis(hydroxyaryl)ethers such as 4,4-dihydroxydiphenylether, 4,4-dihydroxy-3,3'-dimethylphenylether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other bisphenol compounds that may be utilized in the polycondensation of polycarbonate are represented by the formula (V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 5-methyl resorcin, 5-ethyl resorcin, 5-propyl resorcin, 5-butyl resorcin, 5-t-butyl resorcin, 5-phenyl resorcin, 5-cumyl resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, or the like; or combinations comprising at least one of the foregoing bisphenol compounds.

Bisphenol compounds such as 2,2,2',2'-tetrahydro-3,3,3',3'-tetramethyl-1,1'-spirobi-[IH-indene]-6,6'-diol represented by the following formula (VI) may also be used.

Suitable polycarbonates further include those derived from bisphenols containing alkyl cyclohexane units. Such polycarbonates have structural units corresponding to the formula (VII)

wherein $R^a$—$R^d$ are each independently hydrogen, $C_1$-$C_{12}$ hydrocarbyl, or halogen; and $R^e$-$R^i$ are each independently hydrogen, $C_1$-$C_{12}$ hydrocarbyl. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Alkyl cyclohexane containing bisphenols, for example the reaction product of two moles of a phenol with one mole of a hydrogenated isophorone, are useful for making polycarbonate polymer s with high glass transition temperatures and high heat distortion temperatures. Such isophorone bisphenol-containing polycarbonates have structural units corresponding to the formula (VIII)

wherein $R^a$-$R^d$ are as defined above. These isophorone bisphenol based polymer s, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name. The preferred bisphenol compound is bisphenol A.

In one embodiment, the dihydroxy compound may be reacted with a hydroxyaryl-terminated poly(diorganosiloxane) to create a polycarbonate-polysiloxane copolymer. Preferably the polycarbonate-poly(diorganosiloxane)copolymers are made by introducing phosgene under interfacial reaction conditions into a mixture of a dihydroxy compound, such as BPA, and a hydroxyaryl-terminated poly(diorganosiloxane). The polymerization of the reactants can be facilitated by use of a tertiary amine catalyst or a phase transfer catalyst.

The hydroxyaryl-terminated poly(diorganosiloxane) can be made by effecting a platinum catalyzed addition between a siloxane hydride of the formula (IX), and an aliphatically unsaturated monohydric phenol wherein $R^4$ is, for example, $C_{(1-8)}$ alkyl radicals, haloalkyl radicals such as trifluoropropyl and cyanoalkyl radicals; aryl radicals such as phenyl, chlorophenyl and tolyl. $R^4$ is preferably methyl, or a mixture of methyl and trifluoropropyl, or a mixture of methyl and phenyl.

Some of the aliphatically unsaturated monohydric phenols, which can be used to make the hydroxyaryl-terminated poly(diorganosiloxane)s are, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6- methoxy-4-methylphenol, 2-allyl-4,6-dimethylphenol, or the like, or a combination comprising at least one of the foregoing.

Typical carbonate precursors include the carbonyl halides, for example carbonyl chloride(phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl)carbonate, and di(naphthyl)carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate may also be used in the core layer. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethylbenzyl)phenol), 4-chloroformylphthalic anhydride, trimesic acid, benzophenonetetracarboxylic acid, or the like, or combinations comprising at least one of the foregoing branching agents. The branching agents may be added at a level of about 0.05 to about 4.0 weight percent (wt %), based upon the total weight of the polycarbonate in a given layer.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, bis(o-methoxycarbonylphenyl)carbonate, bis(o-ethoxycarbonylphenyl) carbonate, bis(o-propoxycarbonylphenyl)carbonate, bis-orthomethoxyphenylcarbonate, bis(o-butoxycarbonylphenyl)carbonate, bis(isobutoxycarbonylphenyl)carbonate, o-methoxycarbonylphenyl-o-ethoxycarbonylphenylcarbonate, biso-(tert-butoxycarbonylphenyl)carbonate, o-ethylphenyl-o-methoxycarbonylphenyl carbonate, p-(tertbutylphenyl)-o-(tert-butoxycarbonylphenyl)carbonate, bis-methyl salicyl carbonate, bis-ethyl salicyl carbonate, bis-propyl salicyl carbonate, bis-butyl salicyl carbonate, bis-benzyl salicyl carbonate, bis-methyl4-chlorosalicyl carbonate or the like, or combinations comprising at least one of the foregoing carbonic acid diesters. The preferred carbonic acid diester is diphenyl carbonate or bis-methyl salicyl carbonate.

Preferably, the weight average molecular weight of the polycarbonate is about 3,000 to about 1,000,000 grams/mole (g/mole). In one embodiment, the polycarbonate has a molecular weight of about 10,000 to about 100,000 g/mole. In another embodiment, the polycarbonate has a molecular weight of about 20,000 to about 50,000 g/mole. In yet another embodiment, the polycarbonate has a molecular weight of about 25,000 to about 35,000 g/mole.

The thermoplastic polymer is generally used in amounts of about 70 to about 99.9 weight percent (wt %) based upon the weight of the core layer. In one embodiment, the thermoplastic polymer is present in an amount of about 75 to about 99.7 wt %, based on the total weight of the core layer. In another embodiment, the thermoplastic polymer is present in an amount of about 80 to about 99.5 wt %, based on the total weight of the core layer. In yet another embodiment, the thermoplastic polymer is present in an amount of about 85 to about 97 wt %, based on the total weight of the core layer.

The IR absorbing additives are generally fine particles of a metal boride or a boride such as such as lanthanum boride ($LaB_6$), praseodymium boride ($PrB_6$), neodymium boride ($NdB_6$), cerium boride ($CeB_6$), gadolinium boride ($GdB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium borides ($CrB$ and $CrB_2$), molybdenum borides ($MoB_2$, $Mo_2B_5$ and $MoB$), tungsten boride ($W_2B_5$), or the like, or combinations comprising at least one of the foregoing borides.

It is desirable for the IR absorbing additives to be in the form of nanosized particles prior to the dispersion into the polycarbonate. There is no particular limitation to the shape of the particles, which may be for example, spherical, irregular, plate-like or whisker like. The nanosized particles may generally have average largest dimensions of less than or equal to about 200 nanometers (nm). In one embodiment, the particles may have average largest dimensions of less than or equal to about 150 nm. In another embodiment, the particles may have average largest dimensions of less than or equal to about 100 nm. In yet another embodiment, the particles may have average largest dimensions of less than or equal to about 75 nm. In yet another embodiment, the particles may have average largest dimensions of less than or equal to about 50 nm. As stated above, the nanosized particles may generally have average largest dimensions of less than or equal to about 200 nm. In one embodiment, more than 90% of the particles have average largest dimensions less than or equal to about 200 nm. In another embodiment, more than 95% of the particles have average largest dimensions less than or equal to about 200 nm. In yet another embodiment, more than 99% of the particles have average largest dimensions less than or equal to about 200 nm. Bimodal or higher particle size distributions may be used.

The IR absorbing additives are generally used in amounts of about 0.001 gram/square meter ($g/m^2$) to about 2.0 $g/m^2$. In one embodiment, the IR absorbing additive may be used in amounts of about 0.03 to about 1.0 $g/m^2$. In another embodiment, the IR absorbing additive may be used in amounts of about 0.05 to about 0.75 $g/m^2$. In yet another embodiment, the IR absorbing additive may be used in amounts of about 0.09 to about 0.36 $g/m^2$.

The IR absorbing additives are generally used in amounts of about 0.02 ppm to about 3000 ppm based on the total weight of the core layer. In one embodiment, the IR absorbing additive may be used in amounts of about 1 ppm to about 1500 ppm, based on the total weight of the core layer. In another embodiment, the IR absorbing additive may be used in amounts of about 1.5 ppm to about 1250 ppm based on the total weight of the core layer. In yet another embodiment, the IR absorbing additive may be used in amounts of about 2.5 ppm to about 600 ppm, based on the total weight of the core layer and depending on the thickness of the sheet. In one embodiment, the core layer may contain thermal stabilizers to compensate for the increase in temperature brought on by the interaction of the IR light with the IR absorbing additives. Additionally the addition of thermal stabilizers protects the material during processing operations such as melt blending. In general, a layer of polycarbonate containing the IR absorbing additives may experience an increase in temperature of up to about 20° C., upon exposure to light. The addition of thermal stabilizers to the core layer improves the long term aging characteristics and increases the life cycle of the multilayer sheet. In another embodiment, UV stabilizers may also be optionally added to the core layer to prevent against UV degradation. Suitable thermal stabilizers include phosphites, phosphonites, phosphines, hindered amines, hydroxyl amines, phenols, acryloyl modified phenols, hydroperoxide decomposers, benzofuranone derivatives, or the like, or combinations comprising at least one of the foregoing thermal stabilizers. Suitable thermal stabilizers that are commercially available are IRGAPHOS 168, DOVERPHOS S-9228, ULTRANOX 641, while suitable commercially available UV stabilizers are TINUVIN 329, TINUVIN 234, TINUVIN 350, TINUVIN 360 or UVINOL 3030. If desirable, an optional co-stabilizer such as a cyclo aliphatic epoxy polymer or IRGANOX 1076 may also be added to improve thermal stability of the core layer. The preferred thermal stabilizers are phosphites.

It is generally desirable to add the thermal stabilizer in an amount of about 0.001 to about 3 wt %, based on the total weight of the core layer. In one embodiment, the thermal stabilizer may be added in amounts of about 0.002 to about 0.5 wt %, based on the total weight of the core layer. In another embodiment, the thermal stabilizer may be added in amounts of about 0.005 to about 0.2 wt %, based on the total weight of the core layer. In yet another embodiment, the thermal stabilizer may be added in amounts of about 0.01 to about 0.1 wt %, based on the total weight of the core layer. If a co-stabilizer is added, it is generally desirable to add it in amount of about 0.001 to about 2 wt %, based on the total weight of the core layer.

In addition to the thermal stabilizers and the UV stabilizer, other additives such as mold release agents, pigments, dyes, impact modifiers, lubricants, anti-oxidants, anti-microbials, flame retardants, visual effect additives, fibers such as carbon fibers, glass fibers, carbon nanotubes, or the like; antistatic agents, plasticizers, fillers such as fumed silica, aerogels, carbon black, or the like; can be added to both the core and the cap layers.

It is generally desirable for the core layer to have a thickness of about 0.5 to about 30 mm. In one embodiment, the core layer may have a thickness of about 0.75 to about 25 mm. In another embodiment, the core layer may have a thickness of about 0.85 to about 20 mm. In yet another embodiment, the core layer may have a thickness of about 1 to about 15 mm.

As stated above, the multilayered sheet may comprise a single cap layer disposed on an and in intimate contact with the core layer. Alternatively, the multilayered sheet may comprise two cap layers, one cap layer disposed on either surface of the core layer and in intimate contact with it. The cap layer also generally comprises a thermoplastic polymer. Suitable thermoplastic polymers are polycarbonate, copolyestercarbonates, or blends of polyesters with polycarbonates. The polyesters may be cycloaliphatic polyesters, polyarylates or a combination of cycloaliphatic polyesters with polyarylates.

Cycloaliphatic polyesters suitable for use in the cap layer are those that are characterized by optical transparency, improved weatherability, chemical resistance, and low water absorption. It is also generally desirable that the cycloaliphatic polyesters have good melt compatibility with the thermoplastic polymers used in the core layer. In an exemplary embodiment, it is preferred to use a cycloaliphatic polyester that displays good melt compatibility with the polycarbonate used in the core layer. Cycloaliphatic polyesters are generally prepared by reaction of a diol with a dibasic acid or derivative. The diols useful in the preparation of the cycloaliphatic polyester polymers for use as the high quality optical sheets are straight chain, branched, or cycloaliphatic, preferably straight chain or branched alkane diols, and may contain from 2 to 12 carbon atoms.

Suitable examples of diols include ethylene glycol, propylene glycol such as 1,2- and 1,3-propylene glycol, and the like; butane diol such as 1,3- and 1,4-butane diol, and the like; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentaine diol, 1,6-hexane diol, 1,4-cyclohexane dimethanol and particularly its cis- and trans-isomers, triethylene glycol, 1,10-decane diol, and combinations comprising at least one of the foregoing diols. Particularly preferred is dimethanol bicyclo octane, dimethanol decalin, a cycloaliphatic diol or chemical equivalents thereof, and particularly 1,4-cyclohexane dimethanol or its chemical equivalents. If 1,4-cyclohehane dimethanol is to be used as the diol component, it is generally preferred to use a mixture of cis- to trans-isomes in ratios of about 1:4 to about 4:1. Within this range, it is generally desired to use a ratio of cis- to trans-isomers of about 1:3.

The diacids useful in the preparation of the cycloaliphatic polyester polymers are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful provided the polyester has at least one monomer containing a cycloaliphatic ring. Illustrative examples of linear aliphatic diacids are succinic acid, adipic acid, dimethylsuccinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent (e.g., water or acetic acid) at room temperature and at atmospheric pressure using catalysts such as rhodium supported on a carrier comprising carbon and alumina. They may also be prepared by the use of an inert liquid medium wherein an acid is at least partially soluble under reaction conditions and a catalyst of palladium or ruthenium in carbon or silica is used.

Generally, during hydrogenation, two or more isomers are obtained in which the carboxylic acid groups are in cis- or trans-positions. The cis- and trans-isomers can be separated by crystallization with or without a solvent, for example, n-heptane, or by distillation. The cis-isomer tends to be more miscible, however, the trans-isomer has higher melting and crystallization temperatures and is especially preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester polymer.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, and the like, as well as combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two isomers having the carboxylic acid groups in the cis- and trans-positions are obtained. The isomers can be separated, the trans-isomer being especially preferred. Mixtures of the isomers may also be used as detailed above.

The polyester polymers are generally obtained through the condensation or ester interchange polymerization of the diol or diol chemical equivalent component with the diacid or diacid chemical equivalent component and having recurring units of the formula (X):

(X)

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexane-dimethanol-1,4-cyclohexanedicarboxylate) (PCCD) having recurring units of formula (XI)

(XI)

wherein in the formula (IX) $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester polymers can be generally made in the presence of a suitable catalyst such as a tetra(2-ethyl hexyl)titanate, in a suitable amount, generally about 50 to 400 ppm of titanium based upon the total weight of the final product.

PCCD is generally completely miscible with the polycarbonate. It is generally desirable for a polycarbonate-PCCD mixture to have a melt volume rate of greater than or equal to about 5 cubic centimeters/10 minutes (cc/10 min or ml/10 min) to less than or equal to about 150 cubic centimeters/10 minutes when measured at 265° C., at a load of 2.16 kilograms and a four minute dwell time. Within this range, it is generally desirable to have a melt volume rate of greater than or equal to about 7, preferably greater than or equal to about 9, and more preferably greater than or equal to about 10 cc/10 min when measured at 265° C., at a load of 2.16 kilograms and a four minute dwell time. Also desirable within this range, is a melt volume rate of less than or equal to about 125, preferably less than or equal to about 110, and more preferably less than or equal to about 100 cc/10 minutes.

Other preferred cycloaliphatic polyesters that may be mixed with the polycarbonate are polyethelene terephthalate (PET), polybutylene terephthalate (PBT), poly(trimethylene terephthalate) (PTT), poly(cyclohexanedimethanol-co-ethylene terephthalate) (PETG), poly(ethylene naphthalate) (PEN), and poly(butylene naphthalate) (PBN).

Another preferred polyester that may be mixed with other polymers are polyarylates. Polyarylates generally refers to polyesters of aromatic dicarboxylic acids and bisphenols. Polyarylate copolymers that include carbonate linkages in addition to the aryl ester linkages, are termed polyester-carbonates, and may also be advantageously utilized in the mixtures. The polyarylates can be prepared in solution or by the melt polymerization of aromatic dicarboxylic acids or their ester forming derivatives with bisphenols or their derivatives.

In general, it is preferred for the polyarylates to comprise at least one diphenol residue in combination with at least one aromatic dicarboxylic acid residue. The preferred diphenol residue, illustrated in formula (XII), is derived from a 1,3-dihydroxybenzene moiety, referred to throughout this specification as resorcinol or resorcinol moiety. Resorcinol or resorcinol moieties include both unsubstituted 1,3-dihydroxybenzene and substituted 1,3-dihydroxybenzenes.

(XII)

In formula (X), R is at least one of $C_{1-12}$ alkyl or halogen, and n is 0 to 3. Suitable dicarboxylic acid residues include aromatic dicarboxylic acid residues derived from monocyclic moieties, preferably isophthalic acid, terephthalic acid, or mixtures of isophthalic and terephthalic acids, or from polycyclic moieties such as diphenyldi carboxylic acid, diphenylether dicarboxylic acid, and naphthalene-2,6-dicarboxylic acid, and the like, as well as combinations comprising at least one of the foregoing polycyclic moieties. The preferred polycyclic moiety is naphthalene-2,6-dicarboxylic acid.

Preferably, the aromatic dicarboxylic acid residues are derived from mixtures of isophthalic and/or terephthalic acids as generally illustrated in formula (XIII).

(XIII)

Therefore, in one embodiment the polyarylates comprise resorcinol arylate polyesters as illustrated in formula (XIV) wherein R and n are previously defined for formula (XI).

(XIV)

wherein R is at least one of $C_{1-12}$ alkyl or halogen, n is 0 to 3, and m is at least about 8. It is preferred for R to be hydrogen. Preferably, n is zero and m is about 10 and about 300. The molar ratio of isophthalate to terephthalate is about 0.25:1 to about 4.0:1.

In another embodiment, the polyarylate comprises thermally stable resorcinol arylate polyesters that have polycyclic aromatic radicals as shown in formula (XV)

(XV)

wherein R is at least one of $C_{1-12}$ alkyl or halogen, n is 0 to 3, and m is at least about 8.

In another embodiment, the polyarylates are copolymerized to form block copolyestercarbonates, which comprise carbonate and arylate blocks. They include polymers comprising structural units of the formula (XVI)

(XVI)

wherein each $R^1$ is independently halogen or $C_{1-12}$ alkyl, m is at least 1, p is about 0 to about 3, each $R^2$ is independently a divalent organic radical, and n is at least about 4. Preferably n is at least about 10, more preferably at least about 20 and most preferably about 30 to about 150. Preferably m is at least about 3, more preferably at least about 10 and most preferably about 20 to about 200. In an exemplary embodiment m is present in an amount of about 20 and 50.

It is generally desirable for the weight average molecular weight of the polyester to be about 500 to about 1,000,000 grams/mole (g/mole). In one embodiment, the polyester has a weight average molecular weight of about 10,000 to about 200,000 g/mole. In another embodiment, the polyester has a weight average molecular weight of about 30,000 to about 150,000 g/mole. In yet another embodiment, the polyester has a weight average molecular weight of about 50,000 to about 120,000 g/mole. An exemplary molecular weight for the polyester utilized in the cap layer is 60,000 and 120,000 g/mole. These molecular weights are determined against a polystyrene standard.

In one embodiment, it is desirable to match the melt viscosity of the thermoplastic polymer used in the core layer with the melt viscosity of the thermoplastic polymer used in the cap layer during the formation of the multilayer sheet. In another embodiment, it is desirable for the melt viscosity of the thermoplastic polymer used in the cap layer to be equal to the melt viscosity of the thermoplastic polymer used in the core layer, at the point of initial contact of the two melts during the formation of the multilayer sheet. In yet another embodiment, it is desirable for the melt viscosity of the thermoplastic polymer used in the cap layer to be within 1% of the melt viscosity of the thermoplastic polymer used in the core layer, at the point of initial contact of the two melts during the formation of the multilayer sheet. In yet another embodiment, it is desirable for the melt viscosity of the thermoplastic polymer used in the cap layer to be within 5% of the melt viscosity of the thermoplastic polymer used in the core layer, at the point of initial contact of the two melts during the formation of the multilayer sheet. In yet another embodiment, it is desirable for the melt viscosity of the thermoplastic polymer used in the cap layer to be within 10% of the melt viscosity of the thermoplastic polymer used in the core layer, at the point of initial contact of the two melts during the formation of the multilayer sheet. In yet another embodiment, it is desirable for the melt viscosity of the thermoplastic polymer used in the cap layer to be within 20% of the melt viscosity of the thermoplastic polymer used in the core layer, at the point of initial contact of the two melts during the formation of the multilayer sheet.

The polyester and/or copolyestercarbonates are generally used in amounts of about 70 to about 99.9 weight percent (wt %) based upon the weight of the cap layer. Within this range, an amount of greater than or equal to about 75, preferably greater than or equal to about 80, and more preferably greater than or equal to about 85 wt % may be used, based upon the weight of the cap layer. Also desirable within this range, is an amount of greater than or equal to about 98, preferably greater than or equal to about 97, and more preferably greater than or equal to about 95 wt % may be used, based upon the weight of the cap layer.

The cap layer generally comprises a suitable UV absorber. Suitable UV absorbers are benzophenones such as 2,4 dihydroxybenzophenone, 2-hydroxy-4-methoxybenzophenone, 2-hydroxy-4-n-octoxybenzophenone, 4-dodecyloxy-2hydroxybenzophenone, 2-hydroxy-4-octadecyloxybenzophenone, 2,2'dihydroxy-4methoxybenzophenone, 2,2'dihydroxy-4,4'dimethoxybenzophenone, 2,2'dihydroxy-4methoxybensophenone, 2,2',4,4'tetrahydroxybenzophenone, 2-hydroxy-4-methoxy-5sulfobenzophenone, 2-hydroxy-4-methoxy-2'-carboxybenzophenone, 2,2'dihydroxy-4,4'dimethoxy-5sulfobenzophenone, 2-hydroxy-4-(2- hydroxy-3-methylaryloxy)propoxybenzophenone, 2-hydroxy-4chlorobenzopheone, or the like; benzotriazoles such as 2,2'-(hydroxy-5-methylphenyl)benzotriazole, 2,2'-(hydroxy-3',5'-ditert-butylphenyl)benzotriazole, 2,2'-(hydroxy-X-tert, butyl-5'-methyl-phenyl) benzotriazole, or the like; salicylates such as phenyl salicylate, carboxyphenyl salicylate, p-octylphenyl salicylate, strontium salicylate, p-tert butylphenyl salicylate, methyl salicylate, dodecyl salicylate, or the like; and also other ultraviolet absorbents such as resorcinol monobenzoate, 2'ethylhexyl-2-cyano, 3-phenylcinnamate, 2-ethyl-hexyl-2-cyano-3,3-diphenyl acrylate, ethyl-2-cyano-3,3-diphenyl acrylate, [2-2'-thiobis(4-t-octyl-penolate)-1-n-butylamine, or the like, or combinations comprising at least one of the foregoing UV absorbers. A preferred UV absorber for use in the cap layer is UVNUL 3030, commercially available from BASF.

The UV absorbers are generally used in amounts of about 5 wt % to about 15 wt %, based upon the weight of the cap layer. In one embodiment, the UV absorber may be used in an amount of 7 to about 14 wt %, based on the total weight of the cap layer. In yet another embodiment, the UV absorber may be used in an amount of 8 to about 12 wt %, based on the total weight of the cap layer. In one embodiment, the UV absorber may be used in an amount of 9 to about 11 wt %, based on the total weight of the cap layer.

It is generally desirable for the cap layer to have an average thickness of about 10 to about 120 micrometers. In one embodiment, the cap layer may have a thickness of about 15 to about 100 micrometers. In another embodiment, the cap layer may have a thickness of about 20 to about 90 micrometers. In yet another embodiment, the cap layer may have a thickness of about 25 to about 80 micrometers.

The multilayer sheet may generally be produced by extrusion followed by laminating the sheets in a roll mill or a roll stack. The extrusion of the individual layers of the multilayered sheet may be performed in a single screw extruder or in a twin screw extruder. It is desirable to extrude the layers in a single screw extruder and to laminate the layers in a roll mill. It is more desirable to co-extrude the layers in a single screw extruder or twin screw extruder and to optionally laminate the layers in a roll mill. The roll mill may be either a two roll or three roll mill, as is desired. Co-extrusion of the layers by single screw extruders is generally desirable for the manufacturing of the multilayered sheet.

In one embodiment, in the extrusion of the core layer and the cap layer, the additives (e.g., IR absorbing additive and UV absorber) may be added to the extruder along with the thermoplastic polymer at the feed throat. In another embodiment, in the extrusion of the core layer and the cap layer, the additives may be added to the extruder in the form of a masterbatch. While the thermoplastic polymer is fed to the throat of the extruder, the masterbatch may be fed either at the throat of the extruder or downstream or the throat. In one exemplary embodiment, in the production of the core layer, the thermoplastic polymer is fed to the throat of a single screw extruder while the IR absorbing additive is added in masterbatch form downstream of the feed throat. In another exemplary embodiment, in the production of the cap layer, the thermoplastic polymer is fed to the throat of a single screw extruder while the UV absorber is added in masterbatch form downstream of the feed throat.

In one embodiment, the desired composition for the core layer and the cap layer may be separately precompounded prior to coextrusion. In this event, the precompounded materials may be first melt blended in a twin screw extruder, single screw extruder, buss kneader, roll mill, or the like, prior to being formed into a suitable shapes such as pellets, sheets, and the like, for further co-extrusion. The precompounded core and cap layer compositions may ten be fed into the respective extruders for co-extrusion.

As stated above, it is desirable to co-extrude the cap and the core layer. In one embodiment, in one manner of co-extruding of the multilayered sheet, the melt streams (extrudates) from the various extruders are fed into a feed block die where the various melt streams are combined before entering the die. In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. An exemplary die used in the production of the multi-layered sheet is a feed block die. In an exemplary embodiment, the extruders used for the co-extrusion of the cap and core layers are single screw extruders respectively. The co-extruded sheet may optionally be calendared in a roll mill if desired. The multilayered sheet generally has a thickness of about 0.5 to about 35 millimeters.

It is desirable for the multilayered sheet to absorb an amount of greater than or equal to about 90% of all the IR radiation incident upon the surface of the sheet. In one embodiment, the multilayered sheet may absorb an amount of greater than or equal to about 60% of all the IR radiation incident upon the surface of the sheet. In another embodiment, the multilayered sheet may absorb an amount of greater than or equal to about 50% of all the IR radiation incident upon the surface of the sheet. In yet another embodiment, the multilayered sheet may absorb an amount of greater than or equal to about 40% of all the IR radiation incident upon the surface of the sheet. In yet another embodiment, the multilayered sheet may absorb an amount of greater than or equal to about 20% of all the IR radiation incident upon the surface of the sheet. In yet another embodiment, the multilayered sheet may absorb an amount of greater than or equal to about 5% of all the IR radiation incident upon the surface of the sheet.

It is desirable for the multilayered sheet to absorb an amount of greater than or equal to about 90% of all the UV radiation incident upon the surface of the sheet. In one embodiment, the multilayered sheet may absorb an amount of greater than or equal to about 60% of all the UV radiation incident upon the surface of the sheet. In another embodiment, the multilayered sheet may absorb an amount of greater than or equal to about 50% of all the UV radiation incident upon the surface of the sheet. In yet another embodiment, the multilayered sheet may absorb an amount of greater than or equal to about 40% of all the UV radiation incident upon the surface of the sheet. In yet another embodiment, the multilayered sheet may absorb an amount of greater than or equal to about 20% of all the UV radiation incident upon the surface of the sheet. In yet another embodiment, the multilayered sheet may absorb an amount of greater than or equal to about 5% of all the UV radiation incident upon the surface of the sheet.

While it is generally desirable for the multilayer sheet to absorb as much electromagnetic radiation as possible in the UV and IR regions of the electromagnetic spectrum, it is desirable for the multilayered sheet to be transparent to light in the visible region of the electromagnetic spectrum. The visible region of the electromagnetic spectrum generally has wavelengths of about 400 to about 700 nm. It is desirable for the sheet to have a transmissivity to light in the visible region of greater than or equal to about 20%. In one embodiment, it is desirable for the sheet to have a transmissivity to light in the visible region of greater than or equal to about 30%. In another embodiment, it is desirable for the sheet to have a transmissivity to light in the visible region of greater than or equal to about 40%. In yet another embodiment, it is desirable for the sheet for have a transmissivity of greater than or equal to about 50%.

It is also desirable for the multilayered sheet to have a haze of less than or equal to about 5%. In one embodiment, the haze may be less than or equal to about 2%. In another embodiment, the haze may be less than or equal to about 1.8%. In another embodiment, the haze may be less than or equal to about 1.6%.

If the resulting multilayer sheet is in the form of a multiwall sheet, it is generally desirable to have a haze of less than 25%. In one embodiment, the haze may be less than or equal to about 20%. In another embodiment, the haze may be less than or equal to about 15%. In another embodiment, the haze may be less than or equal to about 10%.

Figure 3:
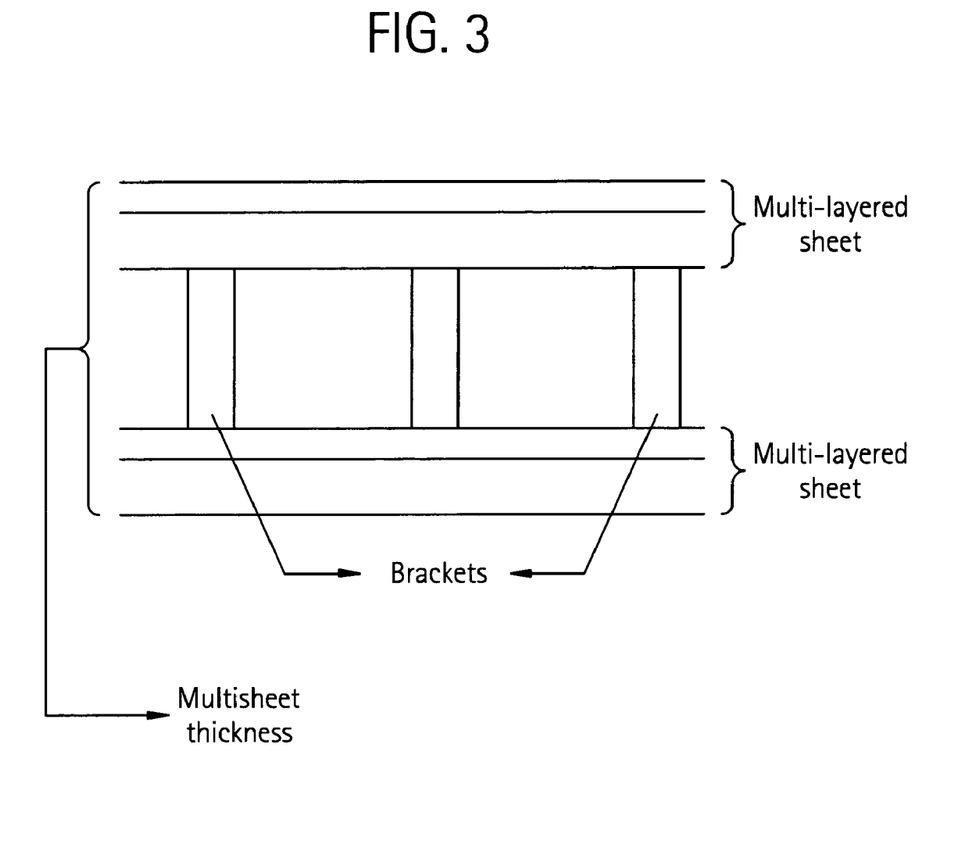
FIG. 3 is a schematic depiction of a multiwall sheet wherein the respective sheets are separated by brackets and having air pockets in between the brackets.

The multilayer sheet thus produced may be advantageously used in automobiles, residential and office buildings or other areas where heat produced by exposure to IR radiation is undesirable. In one embodiment, the sheets may be used as roofing or glazing materials, after being co-extruded as multiwall sheets with air channels in between the walls as shown in FIG. 3. FIG. 3 is a schematic depiction of a multiwall sheet wherein the respective sheets are separated by brackets and having air pockets in between the brackets. The sheet thickness is also depicted in the FIG. 3 and encompasses the brackets as well as the individual multilayer sheets. The brackets may also be made of a thermoplastic polymer such as those described above. In one embodiment, the bracket may be manufactured from polycarbonate, polyester, or polyestercarbonate-polyester.

The multilayer sheet thus formed may also be subjected to additional processing such as thermoforming, vacuum molding, blow molding, shaping, and the like, to produce materials having different shapes and geometries.

The following examples, which are meant to be exemplary, not limiting, illustrate compositions and methods of manufacturing some of the various embodiments of the multilayered sheets using various materials and apparatus.

EXAMPLES

Comparative Example

This example along with the following Example 1 was undertaken to demonstrate the benefits of incorporating the IR absorbing additive in the core layer versus the cap layer. These examples were also undertaken to demonstrate the benefits of placing the cap layer (containing UV absorber) on the surface of the core layer (containing an IR absorbing additive) in such a manner that when the multilayer sheet is subjected to solar radiation, the radiation contacts the cap layer prior to contacting the core layer. In these examples, a 3 mm multilayered sheet having a cap layer (comprising polycarbonate with $LaB_6$ (IR absorbing additive) and a UV absorber) disposed upon a polycarbonate layer was compared with a multilayered sheet having the cap layer containing a UV absorber disposed upon a core layer containing an IR absorbing additive. The comparative example discusses the results of placing the IR absorbing additive ($LaB_6$) in the cap layer, while the following Example 1 discusses the beneficial results of placing the IR absorbing additive ($LaB_6$) in the core layer.

The cap layer thickness was about 60 micrometers, though thickness variations caused the cap layer thickness to vary from about 50 to about 80 micrometers. The composition and construction of the cap layer as well as the core layer are detailed below.

$LaB_6$ in the Cap Layer

Both the cap and the core layer have polycarbonate as the thermoplastic polymer. The polycarbonate was a linear bisphenol A polycarbonate having a weight average molecular weight of 30,000 g/mole.

The cap layer contains 0.18 g/m² of $LaB_6$, 10% Tinuvin 234 and 0.1% Irgafos 168, with the remainder being bisphenol a polycarbonate. The $LaB_6$ was obtained from a masterbatch containing 0.25 wt % $LaB_6$ in linear bisphenol A polycarbonate having a weight average molecular weight of 30,000 g/mole. The aforementioned ingredients were pro-compounded in a twin screw extruder to form a cap layer precompound.

The core layer was first precompounded in a twin screw extruder. The core layer contains 99.75 wt % linear bisphenol A polycarbonate having a weight average molecular weight of 30,000 g/mole, 0.1 wt % pentaerythritoltetrastearate, 0.1 wt % Tinuvin 234 and 0.05 wt % Irgafos 168. The core and cap layer precompounds were then co-extruded in the following manner to produce the multilayer sheet.

The extruder used for extruding the core layer was a Werner and Pfleiderer ZSK extruder 133 mm (twin screw extruder). The barrel temperatures were set at about 200 to 280° C. respectively. The die temperature was 250° C. and the screw speed was 85 rpm. Five barrels having temperatures of 250, 260, 260, 270, 280° C. from feed throat to die respectively. The zone temperatures of the extruder used for making the cap layers (Macgi, Single Screw extruder having a 45 mm barrel diameter) were set between 200 and 280° C. and the screw speed was 58 rpm. Six barrels were used in each of the single screw extruders with the barrel temperatures set at 245, 255, 230, 230, 270, 280° C. respectively. The aforementioned barrel temperatures are, in order, from the feed throat to the feed block of the single screw extruder respectively. Some characteristics of the core layer are given in Table 1.

In the extrusion of the core and cap layers, pre-compounded pellets having the requisite compositions as detailed above, were fed to the extruder via the feed throat. The extrudate from the respective extruders was fed to a feed block die to from the co-extruded multilayer sheet. Light transmission and haze were measured according to ASTM D 1003, while the lab color was measured according to CIE lab DIN 5033 the results are shown in Table 1 below.

TABLE 1

| Sample point across width (mm) | Cap-layer-thickness Top cat layer (micron) | LT (%) | b-value color | Haze (%) | Solar Transmission (%) |
|---|---|---|---|---|---|
| 25 | 61.2 | 59.8 | 12.7 | 7.6 | 49.6 |
| 75 | 74.1 | 55.6 | 14.9 | 8.4 | 44.9 |
| 125 | 67.6 | 57.7 | 13.8 | 8 | 47.1 |
| 175 | 64.4 | 58.7 | 13.3 | 7.8 | 48 |
| 225 | 80.5 | 53.4 | 15.9 | 8.7 | 42.6 |
| 275 | 67.6 | 57.7 | 13.8 | 8 | 46 |

TABLE 1-continued

| Sample point across width (mm) | Cap-layer-thickness Top cat layer (micron) | LT (%) | b-value color | Haze (%) | Solar Transmission (%) |
|---|---|---|---|---|---|
| 325 | 51.5 | 63 | 11.1 | 7.1 | 52.4 |
| 375 | 64.4 | 58.7 | 13.3 | 7.8 | 48.4 |
| 425 | 64.4 | 58.7 | 13.3 | 7.8 | 47.3 |
| 475 | 67.6 | 57.7 | 13.8 | 8 | 46.1 |
| 525 | 64.4 | 58.7 | 13.3 | 7.8 | 47.3 |
| 575 | 54.7 | 61.9 | 11.6 | 7.3 | 50.8 |
| 625 | 54.7 | 61.9 | 11.6 | 7.3 | 50.6 |
| 675 | 58 | 60.9 | 12.2 | 7.5 | 49.3 |
| 725 | 67.6 | 57.7 | 13.8 | 8 | 46.2 |
| 775 | 61.2 | 59.8 | 12.7 | 7.6 | 48.2 |
| 825 | 54.7 | 61.9 | 11.6 | 7.3 | 50.3 |
| 850 | 58 | 60.9 | 12.2 | 7.5 | 49.6 |
| Variation | 51.5-80.5 | 53.4-63 | 11.1-15.9 | 7.1-8.7 | 42.6-52.4 |
| Standard deviation | 7.3 | 2.4 | 1.2 | 0.4 | 2.4 |

From the above table it may be seen that there is a wide variation in the light transmission (LT) of about 53.4 to about 63%. Similarly placing the IR absorbing additive in the cap layer shows that the multilayer sheet has high levels of haze of greater than 7% and wide variations in the level of solar transmission.

Example 1

As stated above, this example demonstrates the efficacy of incorporating the $LaB_6$ in the core layer. A 3-layered multi layered sheet having its core layer containing the $LaB_6$ in the amount shown for Sample #1 in Table 1 was coextruded with a UV cap layer. The sheet contains two cap layers and one core layer. The core layer was disposed between the two cap layers.

The cap layer of the 3-layered sheet was made in the form of a pre-compound that contains 10 wt % UV absorber (Tinuvin 234), 0.1 wt % heat stabilizer (Irgafos 168) and 89.9% linear bipshenol A polycarbonate.

The core layer was first precompounded by feeding and mixing the following product streams: 16 wt % of a $LaB_6$ masterbatch containing 0.032 wt % by weight of $LaB_6$, 0.05% Irgafos 168 and 99.918% linear polycarbonate having a weight average molecular weight of 30,000 to 31,000 g/mole. Secondly 5 wt % of a UV concentrate consisting of 97.5 wt % linear polycarbonate having a weight average molecular weight of 30,000 g/mole, 2 wt % Tinuvin 234 and 0.1 wt % Irgafos 168. The remainder was constituted by 79 wt % linear polycarbonate having a weight average molecular weight of 30,000 g/mole.

The respective pre-compounds were then fed to the respective extruders as detailed in the Comparative Example to produce the multilayer sheet. The results are shown in the Tables 2 and 3. Table 2 depicts some of the characteristics of the multilayer sheet containing the $LaB_6$ in the core layer. Table 3 shows the results obtained for the multilayered sheet having the UV absorbers in the cap layer and the IR absorbing additives in the core layer. In both cases, the cap layer was first contacted by the impinging radiation.

TABLE 2

| Sample # | $LaB_6$ conc. | LT % | ST % | Solar factor | Shading Coeff. | Haze | L | a | b |
|---|---|---|---|---|---|---|---|---|---|
| 1 | 0.18 g/m² | 62.0 | 50.8 | 1.21 | 0.58 | 1.4 | 82.3 | −6.4 | 12.5 |

LT % = light Transmission
ST % = Total Solar Transmission
Solar Factor = Light to Solar gain ratio = Total visible Light Transmission/Total Solar Transmission.
Shading coefficient = total Solar Transmission/87

TABLE 3

| Sample point across width (mm) | LT % | b value color | Haze (%) | Solar Transmission (%) |
|---|---|---|---|---|
| 25 | 62.2 | 12.5 | 1.6 | 50.8 |
| 75 | 62.1 | 12.6 | 1.5 | 51 |
| 125 | 62.2 | 12.5 | 1.4 | 51.1 |
| 175 | 62.1 | 12.5 | 1.4 | 50.2 |
| 225 | 62.2 | 12.6 | 1.4 | 51.2 |
| 275 | 62.2 | 12.6 | 1.4 | 51 |
| 325 | 62.1 | 12.6 | 1.4 | 51.1 |
| 375 | 62.1 | 12.6 | 1.4 | 50.9 |
| 425 | 62.1 | 12.6 | 1.4 | 50.8 |
| 475 | 62.1 | 12.6 | 1.5 | 51 |
| 525 | 62 | 12.6 | 1.4 | 50.8 |
| 575 | 62 | 12.6 | 1.4 | 50.9 |
| 625 | 62 | 12.6 | 1.4 | 50.8 |
| 675 | 62 | 12.6 | 1.4 | 51.2 |
| 725 | 62 | 12.6 | 1.4 | 51.1 |
| 775 | 61.9 | 12.6 | 1.4 | 50.9 |
| 825 | 61.9 | 12.6 | 1.4 | 50.9 |
| 850 | 61.9 | 12.6 | 1.5 | 51 |
| Variation | 61.9-62.2 | 12.5-12.6 | 1.4-1.6 | 50.8-51.2 |
| Standard deviation | 0.1 | 0.06 | 0.018 | 0.2 |

Figure 4:
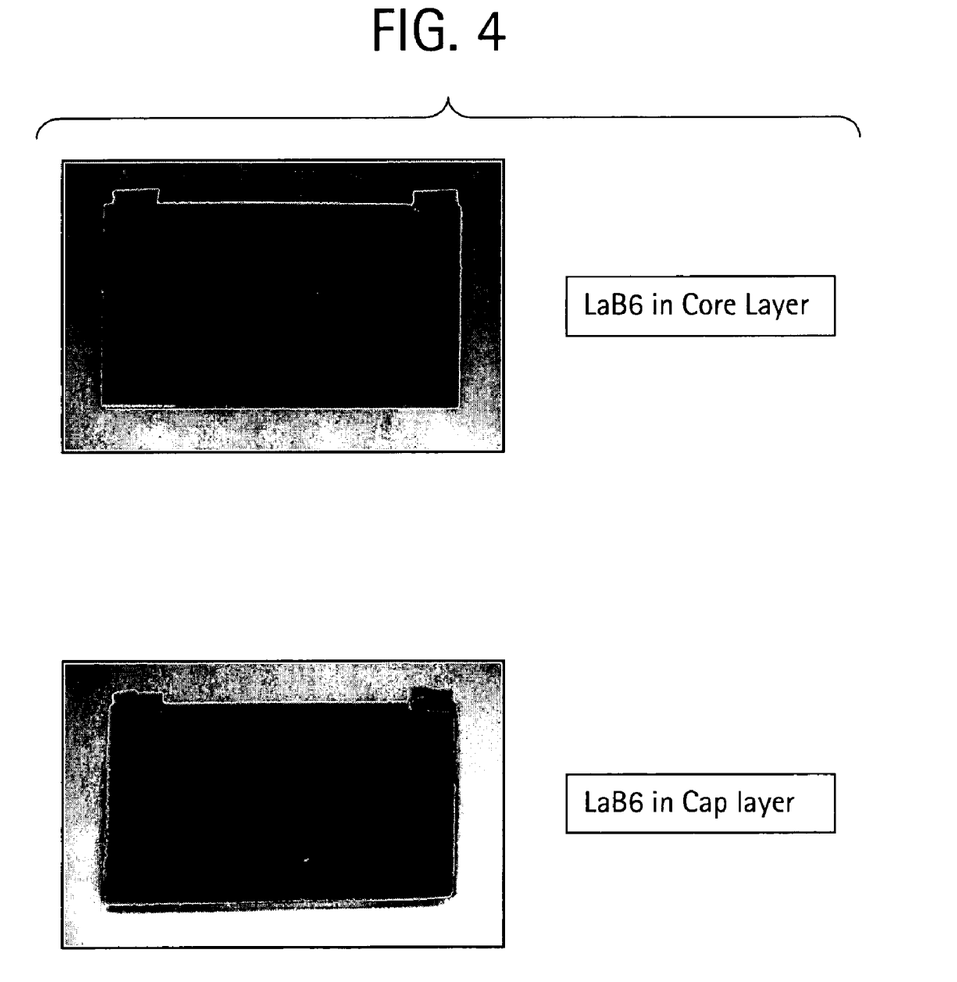
FIG. 4 are photographs of an object taken through two multilayer sheets, one multilayer sheet contained $LaB_6$ in the core layer, while the other had $LaB_6$ in the cap layer.

From the Tables 1 (comparative example) and 3 (present example), it may be seen that having the IR absorbing additive, $LaB_6$, in the cap layer, causes a big variation in the percent light transmission (LT %), and the percent haze, when compared with the multilayered sheet having the IR absorbing additive in the core layer. From Table 3, it may also be seen that the variations in the percent light transmission haze and color are smaller than those for the samples of Table 1. Since it is generally desirable to have the haze as low as possible, dispersing the IR absorbing additive in the core layer produces a superior product over a product where the IR absorbing additive is added to the cap layer. FIG. 4 represents photographs of an object taken through two multilayer sheets, one multilayer sheet contained $LaB_6$ in the core layer, while the other had $LaB_6$ in the cap layer. From this figure it may be clearly seen that while the object can be clearly seen through the multilayer sheet containing the $LaB_6$ in the core layer, it is barely visible through the multilayer sheet containing the $LaB_6$ in the cap layer. It clearly shows the visible variation in color when $LaB_6$ is used in the cap layer.

During this test several other observations were made. As noted above thickness variations of +/− 20 micrometers were observed in the thickness of the cap layer. In order to have an acceptable IR absorption, a target amount of 0.18 grams of $LaB_6/m^2$ of polycarbonate was utilized. When this amount of IR absorbing additive is added to a 60 micrometer cap layer rather than a 3 to 6 millimeter core layer, its concentration is much higher in the cap layer, thus leading to an unacceptable level of haze in the multilayer sheet. Additionally, to protect polycarbonate from UV aging, a UV protective coating or UV adsorber containing cap layer is used on the multi layered sheet. A certain concentration of UV absorbers is needed to reach an acceptable level for the UV protection of PC. One could envision reducing the problem of thickness variation of the cap layer and thereby the observed transmission variations by using a thicker cap layer, for example, a cap layer having a thickness of 500 micrometers (0.5 mm). However, apart from practical problems of making such a cap layer, the need for a high UV concentration throughout the cap layer would increase the cost of the entire multilayer sheet.

Example 2

Figure 5:
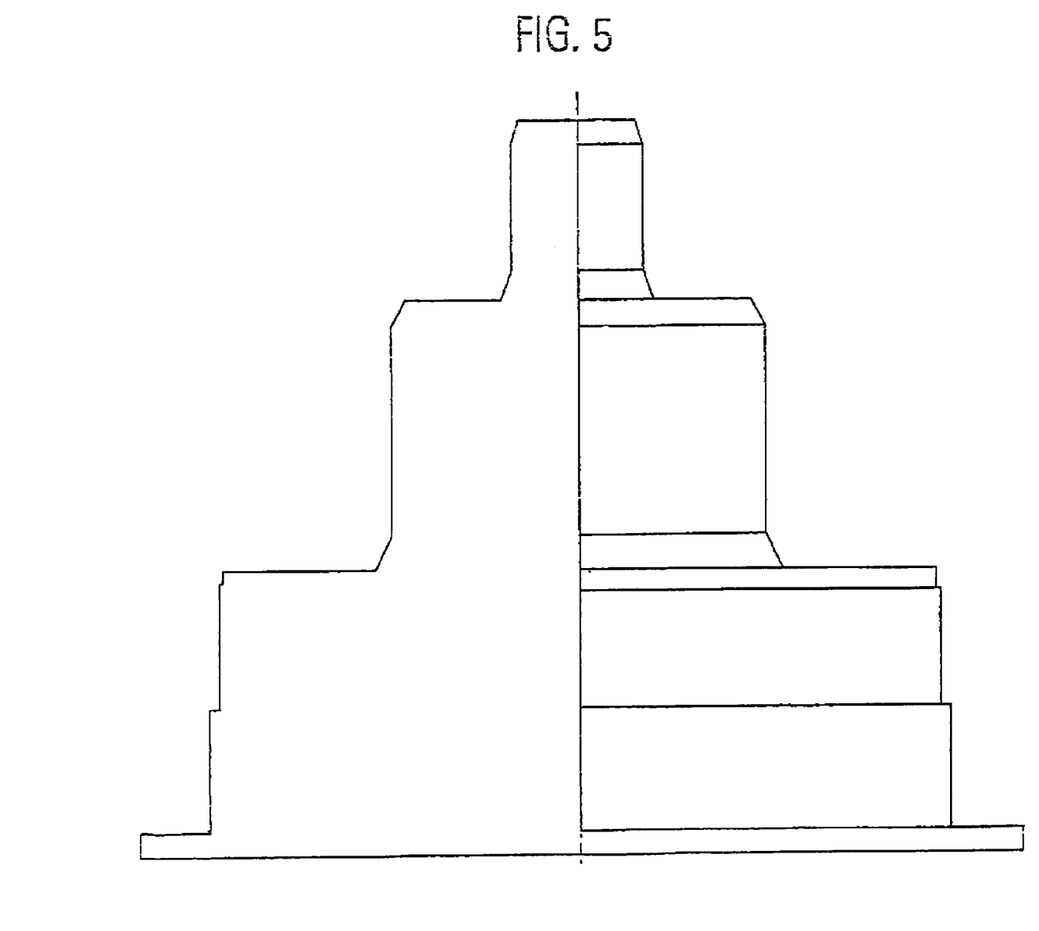
FIG. 5 shows a device over which thermoforming experiments were performed.

This example was undertaken to study the effect of thermoforming the multilayer sheet, on the percent light transmission, solar factor, shading coefficient, and haze. Two 3 millimeter multilayer sheets having $LaB_6$ concentrations of 0.09 and 0.18 g/M² respectively were thermoformed over the device shown in FIG. 5. Lab color measurements were made according CIE lab DIN 5033; solar transmission measurements were made according to ISO9050; haze and light transmission were measured according to ASTM D1003. Upon thermoforming the multilayer sheets over the device shown in the FIG. 5, the sheet shows thickness variations of 1.15 to 2.4 millimeter. The cap layer thickness varies in an amount of about 23 to about 48 micrometers.

Example 3

This example describes the preferred range of $LaB_6$ in the polycarbonate core layer when the thickness of the core layer is 1 millimeter. Polycarbonate samples containing various amounts of $LaB_6$ and 500 ppm Irgaphosl68 were produced on a Werner and Pfleiderer 25 mm twin screw extruder. 1 mm plaques were injection molded on an Engel 75T machine.

The percent of IR radiation that was transmitted was measured on a 'Hitachi U3410 UV-VIS-NIR'. The average of the IR transmission between 780 nm-1400 nm was calculated (IR-T %). Irradiation in this wavelength range is most responsible for heating. The results are shown in Table 4

TABLE 4

| % LaB6 1 mm plaque | La B6 g/m² | Average (IR-T %) 780-1400 nm | LT % | Haze |
| --- | --- | --- | --- | --- |
| 0.0000 | 0.0000 | 79 | 91.1 | 0.9 |
| 0.0016 | 0.0192 | 67 | 87.9 | 0.78 |
| 0.0024 | 0.0288 | 63 | 86.8 | 1.07 |
| 0.0032 | 0.0384 | 56 | 84.8 | 1.12 |
| 0.0064 | 0.0768 | 40 | 79.1 | 1.37 |
| 0.0160 | 0.1920 | 15 | 63.2 | 2.16 |
| 0.0320 | 0.3840 | 3 | 40.9 | 3.37 |
| 0.0640 | 0.7680 | 0 | 21.3 | 5.29 |

The data show that no additional IR absorption effect was obtained when adding more than 0.77% $LaB_6$ to the polycarbonate core layer, when the thickness of the core layer was 1 millimeter.

From the above examples, it may be seen that it is advantageous to use a multilayered sheet, wherein the core layer contains the IR absorbing additive. This protects the IR absorbing additive from the effects of ambient moisture thereby increasing the life of the multilayer sheet. Further the results also demonstrate that there exists a synergy to combining a cap layer containing the UV absorber with a core layer containing the IR absorbing additive. The results clearly show that in the aforementioned configuration, there is improved transparency, lower haze and better color. These multilayered sheets may thus be effectively used in automobiles, residential and office housing.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multilayered sheet consisting essentially of:
   a core layer comprising a thermoplastic polymer and an electromagnetic radiation absorbing additive consisting of an IR absorbing additive; wherein the IR absorbing additive is a boride;
   a first cap layer comprising a thermoplastic polymer and an electromagnetic radiation absorbing additive consisting of an ultraviolet radiation absorbing additive; wherein a surface of the first cap layer is disposed upon and in intimate contact with a surface of the core layer; and
   a second cap layer comprising a thermoplastic polymer and an electromagnetic radiation absorbing additive consisting of an ultraviolet radiation absorbing additive; wherein the second cap layer is disposed upon and in intimate contact with a surface of the core layer opposite the surface in contact with the first cap layer; and
   wherein the multilayered sheet has a haze value of less than or equal to 5%, measured in accordance with ASTM D1003.

2. The sheet of claim 1, wherein the IR absorbing additive is lanthanum boride ($LaB_6$), praseodymium boride ($PrB_6$), neodymium boride ($NdB_6$), cerium boride ($CeB_6$), gadolinium boride ($GdB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), a chromium borides ($CrB$ and/or $CrB_2$), a molybdenum borides ($MoB_2$, $Mo_2B_5$ and/or $MoB$), tungsten boride ($W_2B_5$), or a combination comprising at least one of the foregoing borides.

3. The sheet of claim 1, wherein the IR absorbing additive comprises nanosized particles having average particle dimensions of less than or equal to about 200 nanometers.

4. The sheet of claim 1, wherein the IR absorbing additive is present in amounts of about 0.001 to about 2.0 gram/square meter, measured with respect to the surface of the core layer.

5. The sheet of claim 1, wherein the IR absorbing additive is present in an amount of about 0.02 ppm to about 3000 ppm based on the total weight of the core layer.

6. The sheet of claim 5, wherein the core layer comprises a thermal stabilizer, and further wherein the thermal stabilizer is a phosphite, phosphonite, phosphine, hindered amine, hydroxyl amine, phenol, acryloyl modified phenol, hydroperoxide decomposer, benzofuranone derivative, or a combination comprising at least one of the foregoing thermal stabilizers.

7. The sheet of claim 6, wherein the thermal stabilizer is present in an amount of about 0.001 to about 3 wt %, based on the total weight of the core layer.

8. The sheet of claim 6, wherein the core layer has a thickness of about 0.5 to about 30 mm.

9. The sheet of claim 1, wherein the thermoplastic polymer used in the core layer and/or the first cap layer is polyacetal, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran. polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, or a combination comprising at least one of the foregoing thermoplastic polymers.

10. The sheet of claim 1, wherein the thermoplastic polymer used in the core layer and/or the first cap layer is a bisphenol A polycarbonate, a copolyestercarbonate, or a blend of a polyester with a polycarbonate.

11. The sheet of claim 10, wherein the polyester is a cycloaliphatic polyester, a polyarylate or a combination of a cycloaliphatic polyester with a polyarylate.

12. The sheet of claim 11, wherein the cycloaliphatic polyester has the structure (X)

(X)

13. The sheet of claim 11, wherein the polyaiylate is a resorcinol arylate polyesters having the structure (XII)

(XII)

or the structure (XIII)

(XIII)

where R is a $C_{1-12}$ alkyl or halogen, n is 0 to 3, and m is at least about 8.

14. The sheet of claim 11, wherein the polyarylate is further copolymerized to form a block copolyestercarbonate comprising structural units of the formula (XVI)

(XVI)

wherein each $R^1$ is independently halogen or $C_{1-12}$ alkyl, m is at least 1, p is about 0 to about 3, each $R^2$ is independently a divalent organic radical, and n is at least about 4.

15. The sheet of claim 1, wherein the ultraviolet radiation absorbing additives is a benzophenone, beuzoiriazole, salicylate, resorcinol monobenzoate, 2-ethylhexyl 2-cyano-3-phenylcinnamate, 2-ethylhexyl-2-cyano-3,3-diphenyl acrylate, ethyl-2-cyano-3,3-diphenyl acrylate, 2-2'-thiobis(4-t-octylphenolate)-1-n-butylamine, or a combination comprising at least one of the foregoing ultraviolet radiation absorbing additives and wherein the ultraviolet radiation absorbing additive is present in an amount of 5 to about 15 wt %, based on the total weight of the first cap layer.

16. The sheet of claim 1, having an infrared absorption of greater than or equal to about 20%.

17. The sheet of claim 1, having a transmissivity of greater than or equal to about 40% in the visible light region.

18. The sheet of claim 1, having an infrared absorption of greater than or equal to about 20%, an ultraviolet radiation absorption of greater than or equal to about 20%, and a transmissivity of greater than or equal to about 40% in the visible region.

19. A method for manufacturing a multilayered sheet comprising:
  disposing a first cap layer comprising a thermoplastic polymer and an electromagnetic radiation absorbing additive consisting of an ultraviolet radiation absorbing additive onto a surface of a core layer comprising a thermoplastic polymer and an electromagnetic radiation absorbing additive consisting of an IR absorbing additive, wherein the IR absorbing additive is a borides; and
  disposing a second cap layer comprising a thermoplastic polymer and an electromagnetic radiation absorbing additive consisting of an ultraviolet radiation absorbing additive onto a surface of the core layer opposite the surface contacting the first cap layer;
  wherein the multilayered sheet has a haze value less than or equal to 5%, measured in accordance witb ASTM D1003.

20. The method of claim 19, wherein the core layer is produced simultaneously or sequentially with the first cap layer.

21. The method of claim 19, wherein the second cap layer is produced simultaneously or sequentially with the first cap layer and/or the core layer.

22. The method of claim 19, wherein the disposing is conducted in a two roll mill or a three roll mill.

23. The method of claim 19 further comprising thermoforming, vacuum molding, blow molding, injection molding, and/or compression molding the multilayered sheet.

24. A method for manufacturing a multilayered sheet comprising:
co-extruding a core layer comprising a thermoplastic polymer and an electromagnetic radiation absorbing additive consisting of an IR absorbing additive with a first cap layer comprising a thermoplastic polymer and an electromagnetic radiation absorbing consisting of an ultraviolet radiation absorbing additive, and a second cap layer that comprises a thermoplastic polymer and an electromagnetic radiation absorbing additive consisting of an ultraviolet radiation absorbing additive; wherein the IR absorbing additive is a borides and further wherein the second cap layer is disposed onto a surface of the core layer opposite the surface contacting the first cap layer;
wherein the multilayered sheet has a haze value less than or equal to 5%, measured in accordance with ASTM D1003.

25. The method of claim 24, further comprising laminating the multilayered sheet.

26. An article comprising the sheet of claim 1.

27. An article made by the method of claim 19.

28. An article made by the method of claim 24.

29. A multilayered sheet comprising:
a core layer comprising a thermoplastic polymer and an electromagnetic radiation absorbing additive consisting of an IR absorbing additive; wherein the IR absorbing additive is a boride; and
a first cap layer comprising a thermoplastic polymer and an electromagnetic radiation absorbing additive consisting of an ultraviolet radiation absorbing additive; wherein a surface of the first cap layer is disposed upon and in intimate contact with a surface of the core layer;
wherein the core layer has a thickness of about 0.5 to about 30 mm;
wherein the multilayered sheet has a haze value less than or equal to 5%, measured in accordance with ASTM D1003.

30. The sheet of claim 29, further comprising a second cap layer comprising a thermoplastic polymer and an electromagnetic radiation absorbing additive consisting of an ultraViolet radiation absorbing additive; wherein the second cap layer is disposed upon and in intimate contact with a surface of the core layer opposite the surface in contact with the first cap layer.

31. The sheet of claim 29, wherein the IR absorbing additive is lanthanum boride ($LaB_6$), praseodymium boride ($PrB_6$), neodymium boride ($NdB_6$), cerium boride ($CeB_6$), gadolinium boride ($GdB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), a chromium borides (CrB and/or $CrB_2$), a molybdenum borides ($MoB_2$, $Mo_2B_5$ and/or MoB), tungsten boride ($W_2B_5$), or a combination comprising at least one of the foregoing borides.

32. The sheet of claim 29, wherein the IR absorbing additive comprises nanosized particles having average particle dimensions of less than or equal to about 200 nanometers.

33. The sheet of claim 29, wherein the IR absorbing additive is present in an amounts of about 0.001 to about 2.0 gram/square meter, measured with respect to the surface of the core layer.

34. The sheet of claim 29, wherein the IR absorbing additive is present in an amount of about 0.02 ppm to about 3000 ppm based on the total weight of the core layer.

35. The sheet of claim 34, wherein the core layer comprises a thermal stabilizer, and further wherein the thermal stabilizer is a phosphite, phosphonite, phosphine, hindered amine, hydroxyl amine, phenol, acryloyl modified phenol, hydroperoxide decomposer, benzofuranone derivative, or a combination comprising at least one of the foregoing thermal stabilizers.

36. The sheet of claim 35, wherein thermal stabilizers is present in an amount of about 0.001 to about 3 wt %, based on the total weight of the core layer.

37. The sheet of claim 29, wherein the thermoplastic polymer used in the core layer and/or the first cap layer is polyacetal, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, or a combination comprising at least one of the foregoing thermoplastic polymers.

38. The sheet of claim 29, wherein the thermoplastic polymer used in the core layer and/or the first cap layer is a bisphenol A polycarbonate, a copolyestercarbonate, or a blend of a polyester with a polycarbonate.

39. The sheet of claim 38, wherein the polyester is a cycloaliphatic polyester, a polyarylate, or a combination of a cycloaliphatic polyester with a polyarylate.

40. The sheet of claim 39, wherein the cycloaliphatic polyester has the structure (X)

41. The sheet of claim 39, wherein the polyarylate is a resorcinol arylate polyester having the structure (XII)

or the structure (XIII)

where R is a $C_{1-12}$ alkyl or halogen, n is 0 to 3, and m is at least about 8.

* * * * *